UNITED STATES PATENT OFFICE.

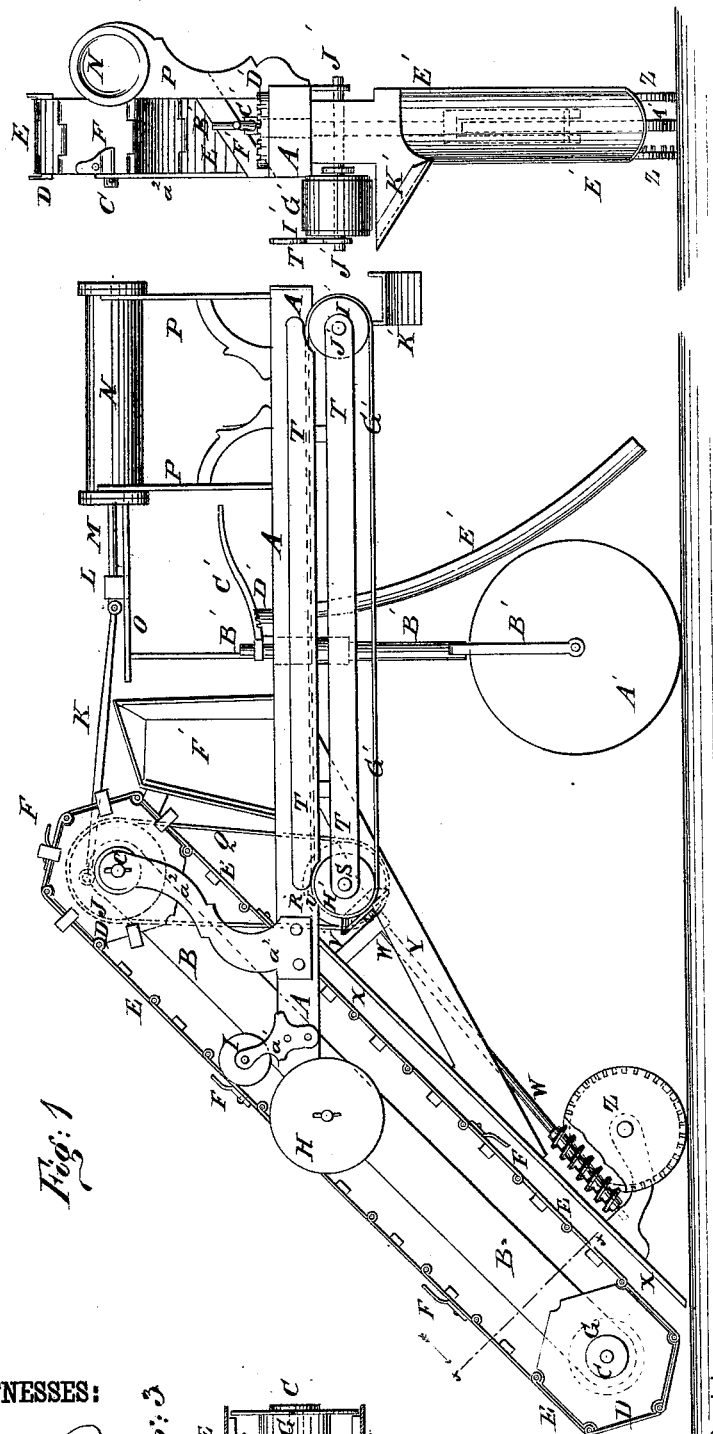

ROBERT E. NEVIN, OF ENON VALLEY, PENNSYLVANIA.

IMPROVEMENT IN DITCHING AND TILE-LAYING MACHINES.

Specification forming part of Letters Patent No. 195,527, dated September 25, 1877; application filed July 9, 1877.

*To all whom it may concern:*

Be it known that I, ROBERT E. NEVIN, of Enon Valley, in the county of Lawrence and State of Pennsylvania, have invented a new and useful Improvement in Ditching and Tile-Laying Machinery, of which the following is a specification:

Figure 1 is a side view of my improved machine. Fig. 2 is a rear view of the same. Fig. 3 is a detail section of the same, taken through the line $x\,x$, Fig. 1.

Similar letters of reference indicate corresponding parts.

The object of this invention is to furnish an improved machine for opening tile-ditches, laying the tiles, and filling the ditches, which may also be used for digging open ditches and making other excavations, and which shall be simple in construction and convenient in use.

The invention will first be described in connection with the drawing, and then pointed out in the claims.

A is the main horizontal frame of the machine, to the center of the forward end of which is attached an inclined plate, bar, or frame, B, placed edgewise. In the ends of the plate, bar, or frame B revolve the centers of the two journals C, to the ends of which are attached the two pairs of chain-wheels D, around which passes the endless chain E, which is made a little wider than the distance between the outer sides of the lower chain-wheels D, so that the forward part of the machine may readily enter the cut made by the said endless chain E. The endless chain E is formed by hinging short plates to each other at their edges. To the plate-links of the chain E are attached cutters F, which are made about half the width of the said chain, are placed upon the opposite sides alternately, and with their edges a little inclined toward the center, so that they will not be clogged by grass, roots, &c. Upon the journals C, between the plate, bar, or frame B and the chain-wheels D, are placed cylindrical washers G, to keep the said journals and chain-wheels in their proper relative positions. The endless chain E is further kept in position by two guide-wheels, H, pivoted to the forward end of the frame A, or to an arm attached to said frame, and which projects across the side edges of said chain.

The endless chain E is kept from sagging under the weight of the dirt being carried up by it by two flanged wheels, I, pivoted to arms $a^1$ attached to the forward end of the frame A, and upon the shoulders of which the side parts of the said chain rest, the flanges of said wheels projecting across the edges of the said chain.

The journal C of the upper chain-wheels D, to which the power is applied, is strengthened against side strain by the arms or brackets $a^2$, in which it revolves, and which are attached to the forward part of the frame A. To one end of the journal of the upper chain wheels D is attached a crank wheel or pulley, J, to the crank-pin of which is pivoted the end of the connecting-rod K. The other end of the connecting-rod K is pivoted to the cross-head L of the piston-rod M of an ordinary compressed-air engine, N.

The cross-head L slides upon ways O attached to the frame A, and the engine N is secured in a frame, P, also attached to the frame A.

Around the crank-wheel J passes a belt, Q, which also passes around a pulley or wheel, R, attached to the end of the shaft S. The shaft S revolves in bearings attached to the frame A and to the frame T, which is attached to the lower part of the side of the said frame A. To the shaft S, beneath the frame A, is attached a bevel-gear wheel, U, the teeth of which mesh into the teeth of the bevel-gear wheel V, attached to the upper end of the inclined shaft W.

The shaft W revolves in bearings attached to the inclined frame X, which is placed parallel with the bar, plate, or frame B, and a little below the lower part of the endless chain E, and its upper end is rigidly attached to the forward part of the frame A.

The frame X is strengthened in position by the braces Y, the lower ends of which are attached to it, and their upper ends are attached to the frame A.

Upon the lower part of the shaft W is formed an endless screw-thread, which engages with cogs or teeth formed upon the inner side of one of the wheels Z, which are pivoted to a bracket attached to the frame X, in such a position as to roll along the bottom of the cut, so that the machine will be fed forward by the mechanism that drives the digging apparatus.

The rear part of the machine is supported by the caster-wheel A' pivoted in and to the forked lower end of the standard B', which passes through and works in a socket in the frame A. To the upper end of the standard B' is attached a lever, C', which moves along the notched upper edge of the curved plate D', so that the wheel A' may be held securely in any position into which it may be adjusted. To the frame A, in the rear of the standard B', is attached the upper end of the spout E', which is curved to the rearward so as to guide the tiles into proper position upon the bottom of the ditch as they are slid down the said spout.

As the dirt carried up by the cutters F of the endless chain E falls from the upper part of the said chain E it falls into the inclined spout F' and slides down it to the endless belt G', the forward part of which passes around a roller, H', attached to the shaft S. The rear part of the endless belt G' passes around a roller, I', attached to the shaft J', which works in bearings attached to the rear ends of the frames A T. At the rear end of the endless carrier G' the dirt falls into the inclined spout K' attached to the rear end of the frame A, down which it slides into the ditch, so as to cover the tiles and fill the ditch.

In the case of open ditches and other excavations, the spout F' may be so arranged as to discharge the dirt at the side of the cut, or into a cart, as may be desired.

Having thus described my invention, I claim as new and desire to secure by Letters Patent—

1. The cutters F, arranged alternately upon opposite edges of the chain E, as and for the purpose described.

2. The combination of the horizontal frame A, the inclined bar, plate, or frame B, the journals C, the chain-wheels D, the cylindrical washers G, the endless chain E, and the cutters F, and the guide-wheels H I with each other, substantially as herein shown and described.

3. The combination of the pulleys and band J R Q, the shaft S, the bevel-gear wheels U V, and the endless screw W with the journal of the chain-wheels D, that carry the chain and cutters E F, with the engine N, and with the frame-work A T X and the drive-wheels Z, substantially as herein shown and described.

4. The connected disks Z Z, having a worm-gear connecting with drive-shaft of chain E, as and for the purpose specified.

5. The combination of the frame T, the shafts S J', the rollers H' I', the endless belt G', and the inclined spout K' with the frame A and the digging mechanism of the machine, substantially as herein shown and described.

ROBERT EMMET NEVIN.

Witnesses:
T. M. STEWART,
T. C. NYE, M. D.